United States Patent [19]

Lo et al.

[11] Patent Number: 4,585,852
[45] Date of Patent: Apr. 29, 1986

[54] TWO-STEP PROCESS FOR PRODUCING POLYETHERIMIDES

[75] Inventors: Jhy-Dou R. Lo, Cupertino, Calif.; William R. Schlich, Pittsfield, Mass.

[73] Assignee: General Electric Company, Pittsfield, Mass.

[21] Appl. No.: 673,331

[22] Filed: Nov. 20, 1984

[51] Int. Cl.$^4$ ............................................. C08G 73/10
[52] U.S. Cl. ................... 528/185; 264/331.19; 264/349; 528/125; 528/126; 528/128; 528/172
[58] Field of Search ............... 528/172, 125, 126, 128, 528/185; 264/331.19, 349

[56] References Cited

U.S. PATENT DOCUMENTS 3,803,085  4/1974  Takekoshi et al. ................ 528/185
3,833,546  9/1974  Takekoshi et al. ................ 528/185
4,011,198  3/1977  Takekoshi et al. ................ 528/185
4,073,773  2/1978  Banucci et al. ................... 528/185

Primary Examiner—Lester L. Lee
Attorney, Agent, or Firm—Bernard, Rothwell & Brown

[57] ABSTRACT

The present invention concerns a two-step extrusion melt polymerization process for making polyetherimides. The first step of the process involves producing a low molecular weight polymer by melt polymerizing a mixture containing a molar excess of one of the monomers. The second step involves melt polymerizing a mixture containing the low molecular weight polymer produced by the first step and a stoichiometrically sufficient amount of the second monomer to produce the desired polyetherimide polymer. Polymerization in two stages, rather than by the conventional one stage process surprisingly results in reduced extruder torque levels and improved throughput rates.

15 Claims, No Drawings

TWO-STEP PROCESS FOR PRODUCING POLYETHERIMIDES

BACKGROUND OF THE INVENTION

The present invention relates to an improved melt polymerization process for making polyetherimides. Melt polymerization methods for making polyetherimides (e.g., see U.S. Pat. No. 3,803,085, Takekoshi and Kochanowski) generally comprise effecting the removal of water of reaction at temperatures up to 400° C. from a melted mixture containing, as essential ingredients, an organic diamine of the formula, $$H_2NRNH_2$$

and an aromatic bis(ether anhydride) of the formula,

where R is a divalent organic radical selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, and (c) $C_{(2-8)}$ alkylene terminated polydiorganosiloxanes, and divalent radicals induced by the formula

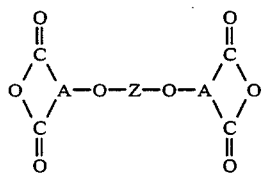

where Q is a member selected from the class consisting of

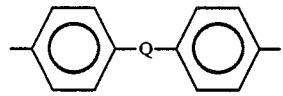

where x is an integer from 1 to about 5 inclusive. The —O—A< group is selected from

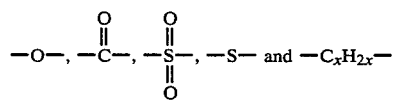

where R' is hydrogen, lower alkyl or lower alkoxy, preferably the polyetherimide includes the latter —O—A< group, wherein R' is hydrogen. Z is a member of the class consisting of

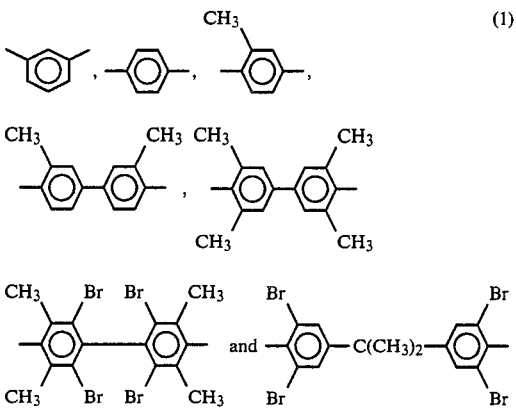

and (2) divalent organic radicals of the general formula

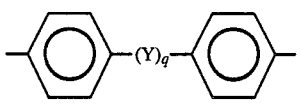

where Y is a member selected from the class consisting of divalent radicals of the formulas,

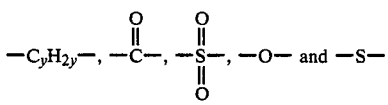

where q is 0 or 1, and y is an integer from 1 to about 5. In preferred polyetherimides —O—A< group is

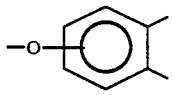

Thus, the resulting polyetherimide has the formula

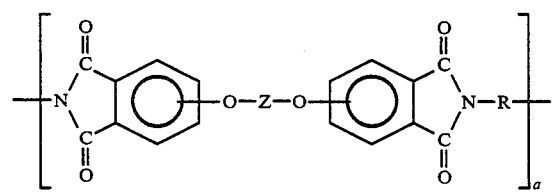

wherein Z and R are as defined above, the divalent bonds of the —O—Z—O— radical are in the 3,3'; 3,4'; 4,3' or the 4,4' positions, and "a" is an integer greater than 1, e.g., from 10 to 10,000 or more. In particularly preferred polyetherimides, Z is a group of the formula

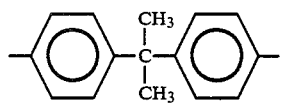

and R is selected from

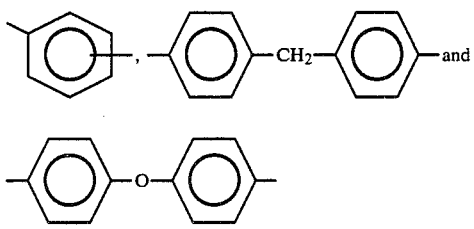

The polyetherimides where R is m-phenylene are most preferred.

In U.S. Pat. Nos. 3,833,546 and 4,011,198, Takekoshi et al. disclose that the above melt polymerization can be performed in a continuous manner by an extrusion melt polymerization process wherein a reaction mixture containing as essential ingredients as organic diamine and a bis(ether anhydride) are continuously fed through an inlet opening into the barrel of a screw extruder maintained at melt polymerization temperatures, and water of reaction is continuously vented from the extruder. The above-cited patents are incorporated herein by reference.

In U.S. Pat. No. 4,073,733, a process is disclosed wherein a mixture of an organic diamine and an aromatic bis(ether anhydride) is continuously fed through an inlet opening into a screw extruder having a second opening downstream from the inlet opening. The mixture is passed through a first extruder zone maintained at a low temperature to a zone where the mixture is melted and water of reaction is continuously removed through the second opening. A melt seal may be employed between the second opening and a third opening through which water of reaction may be removed under vacuum.

During conventional melt polymerization processes, the polymerization mixture passes through a so-called "cement stage." At this stage of polymerization, the melt becomes extremely viscous and difficult to process. Extruder torsion forces sometimes become so high as to cause equipment failure during this stage. Accordingly, there is a need for a melt polymerization process for producing polyetherimides in which the high viscosities associated with the "cement stage" are reduced or eliminated.

SUMMARY OF THE INVENTION

In accordance with the present invention, an improved melt polymerization process involves (a) extruding a first mixture of an organic diamine and an aromatic bis(ether anhydride) under melt polymerization conditions, to form a low molecular weight polymer, wherein said first mixture contains a molar excess of one of the monomers and (b) extruding a second mixture of said low molecular weight polymer with a stoichiometrically sufficient amount of the monomer which was employed at less than stoichiometric amount in step (a), under melt polymerization conditions to form a polyetherimide polymer. Alternatively the polymerization could be conducted batchwise in a reactor such as a Haake Rheocord.

The process of this invention has been found to result in substantially lower torsion forces and ease of water removal in the extruder, as compared to prior art one-step processes in which both monomers are fed into the extruder in stoichiometrically equivalent amounts. Moreover, surprisingly higher throughput rates are achieved with the present two-step process than with prior art one-step processes.

DETAILED DESCRIPTION OF THE INVENTION

In the process of this invention, polyetherimides are prepared by a two-step melt polymerization of an organic diamine and a bis(ether anhydride) as described above.

Any of the aromatic bis(ether anhydride)s described above may be used in the present process include, for example,
2,2-bis[4-(2,3-dicarboxyphenoxy)phenyl]propane dianhydride;
4,4′-bis(2,3-dicarboxyphenoxy)diphenyl ether dianhydride; 1,3-bis(2,3-dicarboxyphenoxy)benzene dianhydride;
4,4′-bis(2,3-dicarboxyphenoxy)diphenyl sulfide dianhydride;
1,4-bis(2,3-dicarboxyphenoxy)benzene dianhydride;
4,4′-bis(2,3-dicarboxyphenoxy)benzophenone dianhydride;
4,4′-bis(2,3-dicarboxyphenoxy)diphenyl sulfone dianhydride;
2,2-bis[4-(3,4-dicarboxyphenoxy)phenyl]propane dianhydride;
4,4′-bis(3,4-dicarboxyphenoxy)diphenyl ether dianhydride;
4,4′-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4-bis(3,4-dicarboxyphenoxy)benzophenone dianhydride;
4-(2,3-dicarboxyphenoxy)-4′-(3,4-dicarboxyphenoxy)-diphenyl-2,2-propane dianhydride; etc.,
and mixtures of such bis(ether anhydride)s.

Additional aromatic bis(ether anhydride)s are shown by Koton, M. M.: Florinski, F. S.; Bessonov, M. I.; Rudakov, A. P. (Institute of Heteroorganic Compounds, Academy of Sciences, USSR) USSR No. 257,010, Nov. 11, 1969, Appln. May 3, 1967, and by M. M. Koton, F. S. Florinski, Zh. Org Khin., 4 (5) 774 (1968).

Bis(ether anhydride)s which are preferred for use in the method of this invention are:
2,2-bis[4-(2,3-dicarboxyphenoxy)phenyl]propane dianhydride;
2,2-bis[4-(3,4-dicarboxyphenoxy)phenyl]propane dianhydride;
4-(2,3-dicarboxyphenoxy)-4′-(3,4-dicarboxyphenoxy)-diphenyl-2,2-propane dianhydride; and mixtures thereof.

Organic diamines used in the process of this invention are generally described above and include, for example,
m-phenylenediamine;
p-phenylenediamine;
4,4′-diaminodiphenylpropane;
4′,4′-diaminodiphenylmethane  (4,4′-methylenedianiline);
bendzidine;
4,4′-diaminodiphenyl sulfide;
4,4′-diaminodiphenyl sulfone;
4,4′-diaminodiphenyl ether (4,4′-oxydianiline);
1,5-diaminonaphthalene;
3,3′-dimethylbenzidine;
3,3′-dimethoxybenzidine;

2,4-bis(β-amino-t-butyl)toluene;
bis(p-β-amino-t-butylphenyl)ether
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.;
and mixtures of such diamines.

Organic diamines preferred herein are m-phenylenediamine; 4,4'-methylenedianiline; 4,4'-oxydianiline; and mixtures thereof.

The process of this invention is conducted in an extruder using two separate process steps. These steps may be accomplished by recycling material through the same extruder, or by employing two extruders connected in series. Alternatively, a single extruder having an intermediate feed stage may be employed. The design of the extruder is not critical to the process, provided that it has heating means and means for removing water formed during the polymerization reaction. Single screw or twin screw extruders may be employed, or batch mixed reactors. Although twin-screw extruders conventionally have been used for the production of polyetherimides, it has now been found that single screw extruders function particularly well in the process of this invention. Single-screw extruders have advantages of simplified construction and operation and concomitant savings in capital costs.

It is known that to produce polyetherimides having high molecular weights and other desirable properties, it is important to control the stoichiometry of the polymerization reaction. The organic diamine and bis(ether anhydride) react together in a molar ratio of 1:1. In prior art processes, reaction conditions are carefully controlled to maintain this 1:1 stoichiometry. Such control can be difficult, particularly in melt polymerization processes, because of differences between the volatilities of the monomers.

It has now been found that the melt polymerization process can be improved by conducting an initial extrusion of a stoichiometrically unbalanced mixture. Such a mixture contains a molar excess of one or the other of the monomers. Extrusion of such a mixture under melt polymerization conditions yields a low molecular weight polymer. This low molecular weight polymer has been found to extrude with lower torsion forces and shorter residence times than corresponding high molecular weight polymer produced when the monomers are employed in 1:1 molar ratios.

In the second extrusion step, the monomer which was employed in less than stoichiometric equivalence in the first step is combined under melt polymerization conditions, with the low molecular weight polymer produced in that step. The ratio of the monomer to the low molecular polymer is controlled such that the second extrusion step produces a substantially stoichiometrically balanced polyetherimide polymer. In this second step, chain stoppers can be employed in the conventional manner to control molecular weight.

In the first extrusion step, either monomer (i.e., either the organic diamine or the bis(ether anhydride)) can be provided in less than a stoichiometrically equivalent amount. It is preferred that the organic diamine be the monomer employed in the lower amount. The ratio of the two monomers in the first extrusion stage can vary considerably, provided that the mixture is sufficiently unbalanced to substantially reduce extruder torsion forces and improve throughput rates. Generally a molar excess of from about 1 mole % to about 18 mole % of one monomer can be employed, preferably an excess from about 1.5 to 5.0 mole %. The ratio of monomer to low molecular weight polymer employed in the second extrusion step is determined by the stoichiometry of the low molecular weight polymer produced by the first step.

It will be appreciated that in a typical melt polymerization procedure performed in one or more extruders, the relative amounts of the reactants are determined by the rates at which such reactants are fed into the extruder. The melt polymerization conditions of the method of this invention are substantially the same as those employed in prior art melt polymerization methods for preparing polyetherimides. These conditions include, for both extrusion steps as extruder temperature ranging from about 100° C. to about 450° C., preferably from about 250° C. to about 375° C. As is generally known, extrusion temperatures are preferably somewhat higher during later stages of the polymerization reaction. As the polymer builds, viscosities increase, therefore, higher temperatures are employed.

Each step advantageously employs means for removing water formed during the polymerization reactions. Such means include, for example, a vent, preferably attached to a vacuum, in the extruder barrel to remove water vapor. Water produced during the reactions can be condensed and collected, and the quantity of water produced used to monitor the course of the reaction. A large portion of the water of reaction can be easily removed during the first step of the two-step process due to the low viscosities present.

Polyetherimide having from 2 to 500 and preferably 10 to 50 average repeating units are typically formed during the first extrusion steps. Such polymers generally have intrinsic viscosities (in chloroform at 25° C.) of from about 0.2 to about 0.3 dl/g. When the stoichiometrically balanced polymer is produced in the second extrusion step, intrinsic viscosities of from about 0.3 to about 0.5 dl/g can be achieved.

As an alternative embodiment of the second extrusion step of the process of this invention, rather than combining the low molecular weight polymer produced in the first extrusion step with a stoichiometry balancing amount of the monomer, such low molecular weight polymer is instead combined with a second low molecular weight polymer which has an excess of the monomer for which the first low molecular weight polymer is deficient. These two low molecular weight polymers are combined in the second extrusion step in proportions which result in a substantially stoichiometrically balanced polyetherimide polymer.

If desired, various fillers and reinforcing agents, such as silica, glass fibers, carbon whiskers perlite and the like, can be blended with the polymers produced by the method of this invention. Such materials are advantageously combined with the polymer materials in the second extrusion step. The resulting compositions can contain up to about 50% by wt. or more of the fillers and reinforcing agents.

EXAMPLE I

In the first step m-phenylene diamine and a 4.71% molar excess of 2,2-bis[4-(2,3-dicarboxyphenoxy)-phenyl]propane dianhydride (BPA-DA) were combined in a 2-inch Sterling Single-Screw Extruder. The extrudate was a low molecular weight polymer with intrinsic viscosity measured at 0.23 to 0.31 dl/g. In the second step, this extrudate was combined with m-phenylene diamine to achieve a stoichiometric balance and this mixture was extruded in a 2" Sterling Extruder at 15 rpm screw speed. Such additional extrusion resulted in polyetherimide with an intrinsic viscosity measured in the range of 0.47 to 0.49 dl/g. Torque forces in the extruder during the first and second extrusion steps were considerably lower than those associated with conventional melt polymerization reactions. In addition, overall throughput rates were significantly improved. Further data is given in the Two-Step Extrusion Polymerization, Table 1.

EXAMPLE II

A one inch Wayne extruder was used for the same compositions as in Example I for the two-step polymerization. An intrinsic viscosity of 0.23 to 0.33 dl/g was achieved for the first step and 0.49 to 0.57 for the second step. The high intrinsic viscosity of 0.57 dl/g and greater polydispersity were due to recycle. Except for the zone 1, step one temperature of 250° F., the zone temperatures ranged from 610° to 675° F. or 321° to 357° C. Water removal was facilitated by the low viscosity during the first step. Further data are in Table 1.

TABLE 1

| | Two-Step Extrusion Polymerization | | | |
|---|---|---|---|---|
| Extruder | Example 1 2" Sterling | | Example 2 1" Wayne | |
| Extrusion Step | 1 | 2 | 1 | 2 |
| Feed Method | Crammer Feeder | Flood | Manual Crammer | Flood |
| Screw - No. of Stage | 3 | 3 | 2 | 2 |
| Set Screw Speed (rpm) | 60 | 15 | 65 | 10 |
| Thruput Rate (lb/hr) | 12 | >10 | 1.47 0.71 0.61 | 0.3-0.7 |
| Barrel Temp °F. | | | | |
| Zone 1 | 200 | 610 | 250 | 600 |
| 2 | 450 | 650 | 660 | 675 |
| 3 | 650 | 700 | 640 | 675 |
| 4 | 650 | 700 | | |
| 5 | 650 | 700 | | |
| Die | 600 | 660 | 620 | 610 |
| Melt Temperature | 575 | 630 | | |

TABLE 1-continued

| | Two-Step Extrusion Polymerization | | | |
|---|---|---|---|---|
| Extruder | Example 1 2" Sterling | | Example 2 1" Wayne | |
| Extrusion Step | 1 | 2 | 1 | 2 |
| (°F.) | | | | |
| $[\eta]$ (dl/g) | 0.23– 0.31 | 0.47– 0.49 | 0.23 0.31 0.33 | 0.49– 0.57* |
| $M_n$ | (0.31 IV) 7,600 | (.47 IV) 11,200 | | (0.49 IV) 14,900 |
| $M_w$ | 19,100 | 33,700 | | (Polystyrene MW) 52,100 |
| Polydispersity | 2.51 | 3.02 | | 3.49 |
| SD Color | | | 112 | 151 |
| Argon Blanketing | No | No | Yes | No |
| Run Time (min) | 60 | 30 | 30 30 30 | 52 |
| Mole % excess BPA-DA | 4.71 | | 4.71 | |

*High IV due to recycle

We claim:

1. A process for producing a polyetherimide which comprises
(A) extruding a first mixture of an organic diamine of the formula $$H_2N-R-NH_2$$

and an aromatic bis(ether anhydride) of the formula

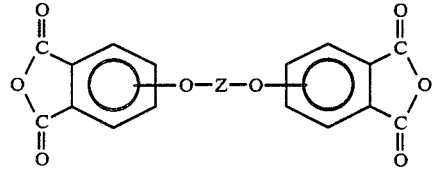

under melt polymerization conditions to form a low molecular weight polymer, wherein said mixture contains a stoichiometric molar excess of the organic diamine or the aromatic bis(ether anhydride); and
(B) extruding, under melt polymerization conditions, a second mixture of the low molecular weight polymer produced by step (A) and a stoichiometrically sufficient amount of the monomer which was employed at the lower molar amount in step (A) to produce a polyetherimide, of the formula

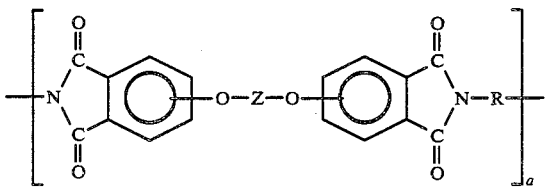

wherein "a" is an integer greater than 1, R is a divalent aromatic organic radical selected from the group consisting of (a) aromatic hydrocarbon radicals having from 6 to about 20 carbon atoms and halogenated derivatives thereof, (b) alkylene radicals and cycloalkylene radicals having from 2 to about 20 carbon atoms, C$_{(2-8)}$ alkylene terminated polydiorganosiloxanes, and (c) divalent radicals included by the formula

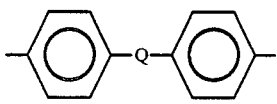

where Q is a member selected from the group consisting of

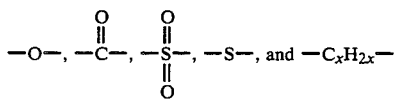

where x is an integer from 1 to about 5; Z is a member of the class of (1)

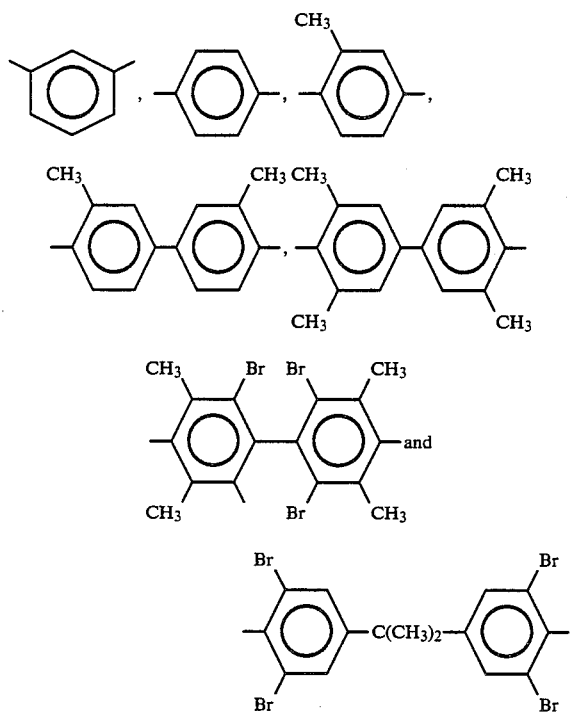

and (2) divalent organic radicals of the formula

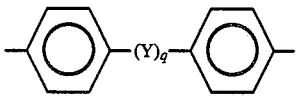

wherein Y is a member of the class consisting of divalent radicals of the formulas

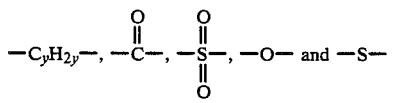

wherein q is 0 or 1 and y is an integer from 1 to about 5; and the divalent bonds of the —O—Z—O— group are in the 3,3',3,4',4,3' or the 4,4' positions.

2. The process of claim 1, wherein, in the step (A), the organic diamine is employed in the lower molar amount.

3. The process of claim 1, wherein, in step (A), the aromatic bis(ether anhydride) is employed in the lower molar amount.

4. The process of claim 2 or 3, wherein the monomer employed in the higher amount is present at a molar excess of from about 1 mole % to about 18 mole %.

5. The process of claim 2 or 3, wherein the monomer employed in the higher amount is present at a molar excess of from about 1.5 to 5.0 mole %.

6. The process of claim 4, wherein the melt polymerization conditions include an extruder temperature of from about 100° C. to about 450° C., and means for removing water produced by the reaction during each step.

7. The process of claim 5, wherein the melt polymerization conditions include an extruder temperature of from about 250° C. to about 375° C., and means for removing water produced by the reaction during each step.

8. The process of claim 7, wherein the low molecular weight polymer produced in step (A) has an intrinsic viscosity of from about 0.2 to about 0.3, and the polyetherimide produced in step (B) has an intrinsic viscosity of from about 0.3 to about 0.5.

9. The process of claim 7, wherein Z is a group of the formula

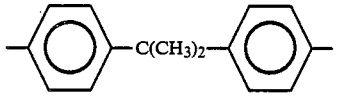

and R is selected from

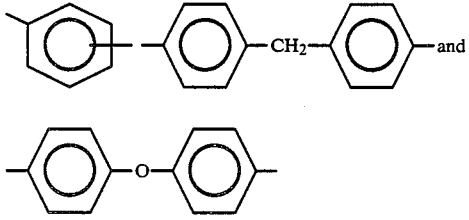

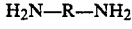

10. The process of claim 9, wherein R is m-phenylene.

11. The process of claim 1, wherein the extrusion is conducted in a single screw extruder.

12. The process of claim 9, wherein the extrusion is conducted in a single screw extruder.

13. The process of claim 10, wherein the extrusion is conducted in a single screw extruder.

14. The process of claim 1 wherein process steps A and B are conducted in batch reactors.

15. A process for producing a polyetherimide which comprises
(A) extruding a first mixture of an organic diamine of the formula

H$_2$N—R—NH$_2$ and an aromatic bis(ether anhydride) of the formula

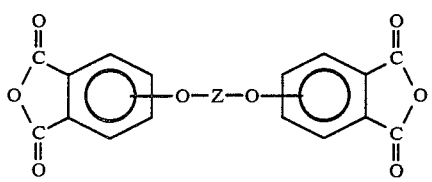

under melt polymerization conditions to form a low molecular weight polymer, wherein said mixture contains a stoichiometric molar excess of the organic diamine or the aromatic bis(ether anhydride); and (B) extruding, under melt polymerization conditions, a second mixture of the low molecular weight polymer produced by step (A) and a low molecular weight polymer which has an excess of the monomer for which the low molecular weight polymer produced in step (A) is deficient to produce a polyetherimide, of the formula

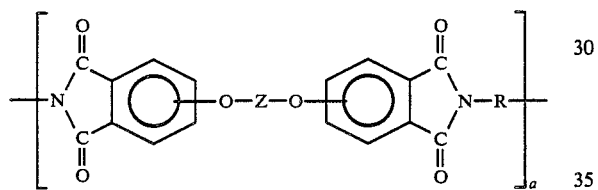

wherein "a" is an integer greater than 1, R is a divalent aromatic organic radical selected from the group consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxanes, and (c) divalent radicals included by the formula

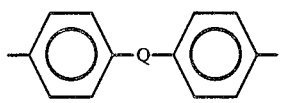

where Q is a member selected from the group consisting of

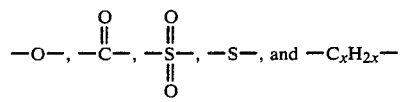

where x is an integer form 1 to about 5; Z is a member of the class of (1)

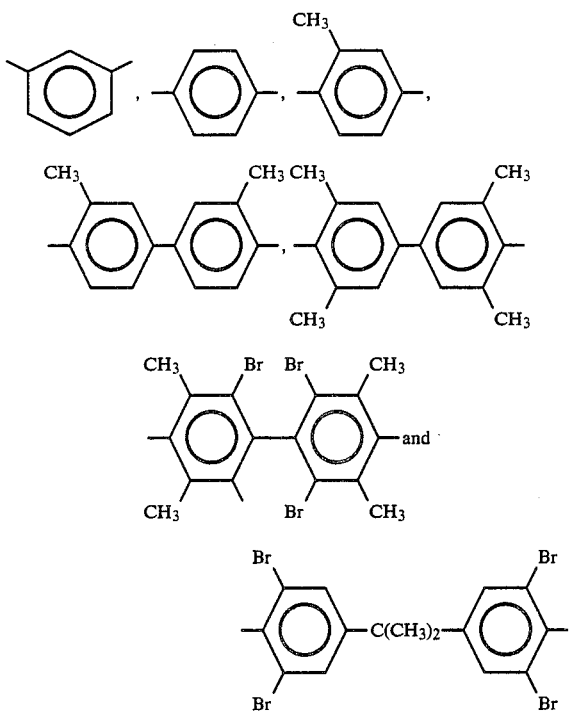

and (2) diavalent organic radicals of the formula

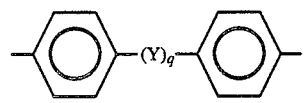

wherein Y is a member of the class consisting of divalent radicals of the formulas

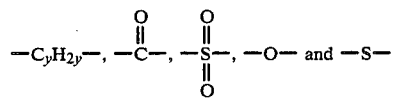

wherein q is 0 or 1 and y is an integer from 1 to about 5; and the divalent bonds of the —O—Z—O— group are in the 3,3',3,4',4,3' or the 4,4' positions.

* * * * *